United States Patent
Suozzi

(10) Patent No.: US 7,025,110 B1
(45) Date of Patent: Apr. 11, 2006

(54) METHOD AND APPARATUS FOR SETTING ODD-SHAPED PRECIOUS STONES

(76) Inventor: Arthur Suozzi, 420 Ellis Rd., Langhorne, PA (US) 19047

( * ) Notice: Subject to any disclaimer, the term of this patent is extended or adjusted under 35 U.S.C. 154(b) by 36 days.

(21) Appl. No.: 10/459,215

(22) Filed: Jun. 12, 2003

(51) Int. Cl.
*B22C 9/22* (2006.01)
*B23P 5/00* (2006.01)

(52) U.S. Cl. .............. 164/35; 164/516; 29/10; 29/896.4

(58) Field of Classification Search ........... 63/26–31; 264/DIG. 55; 164/34–36, 516–519; 29/10, 29/896.4, 896.41, 896.412
See application file for complete search history.

(56) References Cited

U.S. PATENT DOCUMENTS

| | | | |
|---|---|---|---|
| 531,731 A * | 1/1895 | Marquart | 29/10 |
| 2,790,220 A * | 4/1957 | Fox | 164/35 |
| 3,876,511 A * | 4/1975 | Feller | 205/114 |
| 5,190,024 A * | 3/1993 | Senanayake | 125/30.01 |
| 5,426,836 A * | 6/1995 | Lynch | 29/10 |
| 5,758,517 A * | 6/1998 | Freilich | 63/28 |
| 6,493,912 B1 | 12/2002 | Ho | |

* cited by examiner

*Primary Examiner*—Jack W. Lavinder

(57) ABSTRACT

A piece of jewelry such a pendant is first cast in wax to provide a wax replica thereof. A gemstone is heated above the melting temperature of the wax replica and is pressed therein. Alternatively, the gemstone is positioned on the surface of the wax replica and pressure is applied to the gemstone to partially embed the gemstone in the wax replica surface at room temperature. The wax replica is then used to from the plaster of Paris mold wherein liquid metal is then poured within the plaster of Paris mold to replace the plaster to form the finished product.

1 Claim, 1 Drawing Sheet

METHOD AND APPARATUS FOR SETTING ODD-SHAPED PRECIOUS STONES

BACKGROUND OF THE INVENTION

Precious stones, hereafter "gemstones" are generally attached to finger rings, earrings, bracelets and the like by arranging prongs extending from the carrier and placing the gemstones within the prongs in press-fit relation. The requirement of providing prongs and the like to hold such gemstones increases the jewelry production process.

One casting method for setting precious gemstones, without requiring prongs is described in U.S. Pat. No. 5,758,517 entitled "Method and Apparatus to set Precious Stones Without Hammering".

A further method for attaching gemstones to the associated carrier without requiring prongs is described in U.S. Pat. No. 4,392,289 entitled "Manufacture of Jewelry by Casting with Preset Gems".

Before final casting of a gemstone within the associated metal structure, such as in forming a gemstone pendant, a wax model replica of the pendant containing the gemstone is first required. A large number of natural gemstones having odd-shapes, such as rough diamonds for example, must be shaped and polished to fit within the wax model, or the wax model must be adapted to receive the gemstone, at a substantial increase in production costs.

Since the majority of naturally occurring gemstones are odd-shaped, it would be economically advantageous to find a cost effective method for attaching such odd-shaped gemstones to the metal substrate without having to shape and polish the gemstones in the process.

One purpose of the instant Invention is to describe a simple and economical method for attaching an odd-shaped gemstone to the wax model, without later requiring cement, prongs, channels or other mechanical means of attachment when the gemstone is later attached to the metal carrier.

SUMMARY OF THE INVENTION

A model of a piece of jewelry that is to contain an odd-shaped gemstone is first cast in wax to provide a replica of the jewelry which is then cast in a plaster mold to receive the carrier metal. Prior to casting the plaster mold, the gemstone is heated above the melting temperature of the wax replica and is pressed therein. Once the wax has cooled in the vicinity of the gemstone, the gemstone is captured within the wax replica, which is then used to from the plaster mold. Alternatively, pressure is applied to the gemstone in contact with the wax replica surface to embed the gemstone at room temperature and the wax replica is then used to from the plaster mold. Liquid silver or gold metal is then poured within the plaster mold to replace the plaster to form the finished product. Other pieces of jewelry containing gemstones, such as rings, bracelets, earrings and the like can be formed in a similar manner.

DESCRIPTION OF THE PREFERRED EMBODIMENT

Figure 1:
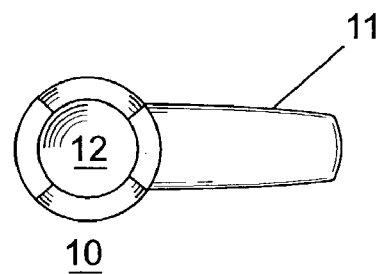
FIG. 1 is a top planar view of a pendant formed in a wax replica.

In FIG. 1, a wax replica pendant 10 is depicted in the form of a carrier arm 11 attached to a gem support plate 12. The wax replica pendant 10 is the first step in producing a similar pendant in the manner described in aforementioned U.S. Pat. No. 4,392,289 wherein the wax replica is then cast in plaster and the plaster is replaced by metal. The material for the wax replica pendant comprises a soft wax such as jewelry wax or dental wax.

Figure 1A:
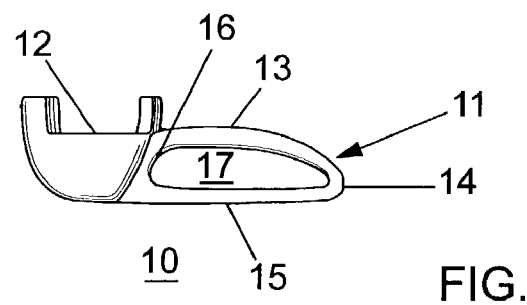
FIG. 1A is a side planar view of the wax replica of FIG. 1 prior to placement of the gemstone.

The replica pendant 10 is shown in FIG. 1A depicting the gem support plate 12 next to the arm 11 which includes a top 13 and bottom 15 joined by opposing sides 14, 16 to define an aperture 17 for receiving a necklace chain 23 (FIG. 3) when the pendant 10 is later cast in metal.

Figure 2:
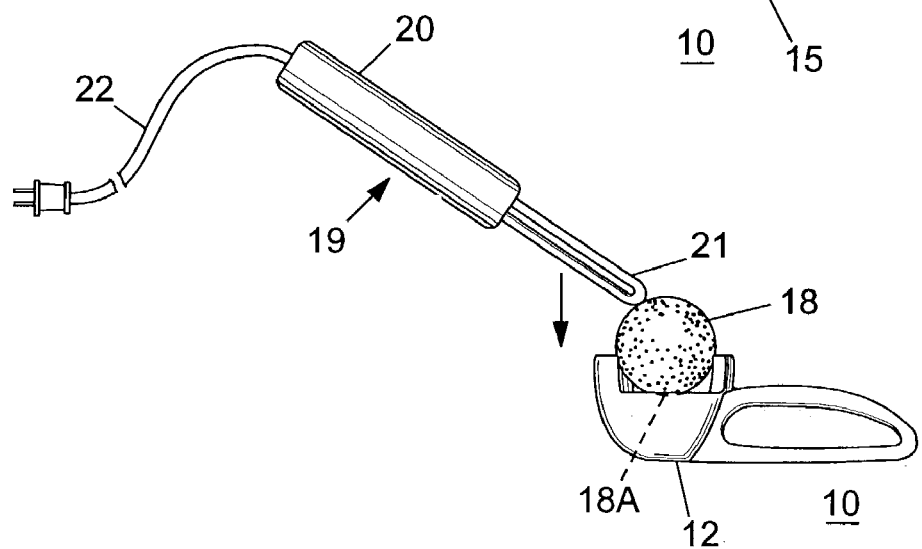
FIG. 2 is a front perspective view of the wax replica of FIGS. 1 and 1A with the gemstone in contact with a surface of the wax replica and a heating tool in contact with a surface of the gemstone.

In accordance with the invention, a gemstone 18, such as a rough diamond, shown in FIG. 2, is first positioned on the surface of the plate 12 the wax replica pendant 10 and is heated upon contact with a heater 21 on the operating end of a heat gun 19 by manipulation of the handle 20. Electric power is supplied to the heat gun 19 via the electric cord 22. One effective heat gun is a "MasterTouch" obtained from Kerr Manufacturing. The high thermal conductivity of the diamond material rapidly raises the temperature of the gemstone 18 above the melting point of the wax material such that the portion of the plate 12 in contact with the gemstone 18 melts and becomes displaced by the gemstone as indicated at 18A. Alternatively, a jeweler's hand tool (not shown) could be used in place of the heat gun 19 to apply pressure to the gemstone 18 to force the gemstone within the plate 12 at room temperature. Once the gemstone 18 is embedded within the plate 12, the pendant mold 10 is then subjected to the plaster and metal molding process, described earlier, such the gemstone 18 remains in position within the metal pendant 10' as best seen by referring now to FIG. 3.

Figure 3:
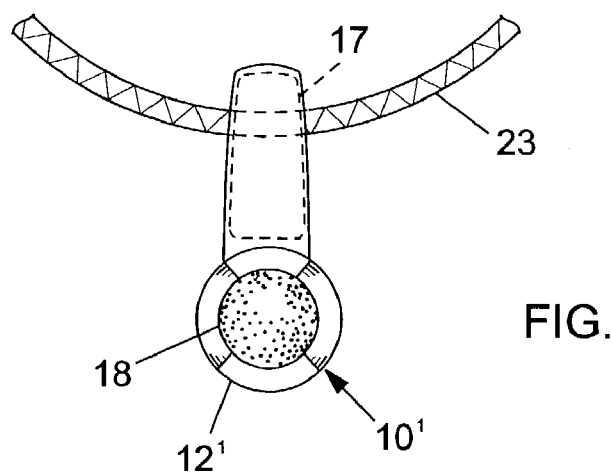
FIG. 3 is a front perspective view of the finished pendant according to the invention and containing the gemstone of FIG. 2 with a necklace chain attached thereto.

The final metal pendant 10', shown in FIG. 3, fixedly retains the gemstone 18 within the metal plate 12' by the large surface area of the rough surface of the gemstone 18 in contact with the plate 12' such that no prongs or cement are required to retain the gemstone therein.

A method has herein been describe whereby an odd-shaped gemstone is inserted within a wax jewelry replica under pressure at room temperature, or at an elevated temperature, to allow insertion of the gemstone within the wax surface. Upon later insertion of the liquid metal within the final plaster mold, the metal becomes displaced in the region of contact with the gemstone for permanent attachment therewith.

What is claimed is:

1. A method for attaching a gemstone within a metal piece of jewelry comprising the steps of:
    forming a wax replica of a piece of jewelry;
    heating an uncut gemstone above the melting point of the wax replica;
    contacting the wax replica with the heated uncut gemstone to imbed the uncut gemstone a predetermined distance within the wax replica surface to form a wax replica casting;
    forming a plaster mold from said wax replica casting; and
    inserting liquid metal within said plaster mold whereby said uncut gemstone displaces a portion of said liquid metal for retention of said uncut gemstone when said liquid metal later becomes solidified.

* * * * *